(12) United States Patent
Moritani et al.

(10) Patent No.: US 11,752,619 B2
(45) Date of Patent: Sep. 12, 2023

(54) GEAR MOTOR AND COOPERATING ROBOT

(71) Applicant: SUMITOMO HEAVY INDUSTRIES, LTD., Tokyo (JP)

(72) Inventors: Koji Moritani, Kanagawa (JP); Akira Yamamoto, Kanagawa (JP)

(73) Assignee: SUMITOMO HEAVY INDUSTRIES, LTD., Tokyo (JP)

(*) Notice: Subject to any disclaimer, the term of this patent is extended or adjusted under 35 U.S.C. 154(b) by 212 days.

(21) Appl. No.: 16/200,229

(22) Filed: Nov. 26, 2018

(65) Prior Publication Data

US 2019/0160654 A1    May 30, 2019

(30) Foreign Application Priority Data

Nov. 28, 2017 (JP) ................... 2017-227364

(51) Int. Cl.
| | |
|---|---|
| *F16H 49/00* | (2006.01) |
| *B25J 9/10* | (2006.01) |
| *B25J 9/00* | (2006.01) |
| *H02K 21/14* | (2006.01) |
| *H02K 7/116* | (2006.01) |
| *B25J 18/00* | (2006.01) |

(52) U.S. Cl.
CPC ............. *B25J 9/0009* (2013.01); *B25J 9/102* (2013.01); *B25J 18/00* (2013.01); *F16H 49/001* (2013.01); *H02K 7/116* (2013.01); *H02K 21/14* (2013.01)

(58) Field of Classification Search
CPC ...... B25J 9/0045; B25J 17/00; B25J 17/0241; B25J 9/102; B25J 9/1025; B25J 9/103; F16H 49/001
See application file for complete search history.

(56) References Cited

U.S. PATENT DOCUMENTS

| | | | | |
|---|---|---|---|---|
| 3,052,120 A | * | 9/1962 | Goodman | B63B 71/20 73/148 |
| 3,936,847 A | * | 2/1976 | Erlichman | G03B 17/52 396/443 |
| 4,506,590 A | * | 3/1985 | Miki | B25J 17/0241 192/30 W |

(Continued)

FOREIGN PATENT DOCUMENTS

| | | |
|---|---|---|
| CN | 104006145 A | 8/2014 |
| JP | S62-004586 A | 1/1987 |

(Continued)

OTHER PUBLICATIONS

Ashby, Michael F; Materials Selection in Mechanical Design, 1999, Butterworth_Heinemann, p. 46 (Year: 1999).*

(Continued)

*Primary Examiner* — Bobby Rushing, Jr.
(74) *Attorney, Agent, or Firm* — Michael Best & Friedrich LLP (57) ABSTRACT

A gear motor includes a motor and a speed reducer and drives a joint portion of a cooperating robot which performs a work in collaboration with a person. In addition, in the gear motor, an operation ratio is 20% ED or less, a reduction ratio of the speed reducer is 30 or less, and an output rotating speed of the motor is 1000 rpm or less.

18 Claims, 3 Drawing Sheets

(56) References Cited

U.S. PATENT DOCUMENTS

| | | | |
|---|---|---|---|
| 4,690,010 A * | 9/1987 | Matsumoto | B25J 9/126 |
| | | | 74/469 |
| 4,928,556 A | 5/1990 | Matsumoto et al. | |
| 6,564,664 B1 | 5/2003 | Battlogg | |
| 6,893,371 B2 * | 5/2005 | Mills | F16H 61/32 |
| | | | 475/149 |
| 7,253,578 B2 * | 8/2007 | Kumagai | B25J 17/00 |
| | | | 318/568.18 |
| 7,290,772 B2 * | 11/2007 | Taneda | B60G 21/0555 |
| | | | 280/124.107 |
| 8,247,941 B2 * | 8/2012 | Okubo | H02K 29/03 |
| | | | 310/156.47 |
| 3,435,149 A1 | 5/2013 | Koyama et al. | |
| 8,729,769 B2 | 5/2014 | Takeuchi | |
| 9,281,735 B2 * | 3/2016 | Gandhi | H02K 41/033 |
| 9,321,172 B2 * | 4/2016 | Johnson | B25J 9/08 |
| 9,341,252 B2 * | 5/2016 | Zhang | H02M 7/48 |
| | | | 180/444 |
| 9,783,262 B2 * | 10/2017 | Dubose | B62M 6/55 |
| 9,827,681 B2 | 11/2017 | Naitou et al. | |
| 9,903,774 B2 | 2/2018 | Nakayama et al. | |
| 2005/0206267 A1 * | 9/2005 | Koshiishi | H02K 1/02 |
| | | | 310/216.006 |
| 2006/0169526 A1 * | 8/2006 | Honbo | H02M 7/48 |
| | | | 180/444 |
| 2008/0295623 A1 * | 12/2008 | Kurita | B25J 9/102 |
| | | | 74/25 |
| 2009/0289591 A1 * | 11/2009 | Kassow | B25J 19/0004 |
| | | | 901/3 |
| 2013/0106252 A1 * | 5/2013 | Yanagida | H02K 11/225 |
| | | | 310/68 B |
| 2015/0122072 A1 * | 5/2015 | Wu | B23Q 1/5406 |
| | | | 74/490.05 |
| 2015/0209958 A1 * | 7/2015 | Hasegawa | B25J 9/102 |
| | | | 74/416 |
| 2015/0209966 A1 * | 7/2015 | Hasegawa | F16H 1/12 |
| | | | 74/490.03 |
| 2015/0247563 A1 * | 9/2015 | Yeh | F16H 49/001 |
| | | | 74/457 |
| 2016/0031084 A1 | 2/2016 | Yamazaki | |
| 2016/0101526 A1 * | 4/2016 | Saito | H02K 11/225 |
| | | | 310/68 B |
| 2016/0221185 A1 * | 8/2016 | Sueyoshi | B60G 21/0555 |
| | | | 280/124.107 |
| 2016/0276895 A1 * | 9/2016 | Aizawa | H02K 5/18 |
| 2016/0365812 A1 * | 12/2016 | Nakamura | H02P 8/24 |
| 2017/0201154 A1 * | 7/2017 | Brassitos | F16C 19/546 |
| 2019/0036419 A1 | 1/2019 | Ayuzawa et al. | |

FOREIGN PATENT DOCUMENTS

| | | |
|---|---|---|
| JP | 2002-541011 A | 12/2002 |
| JP | 2007-211976 A | 8/2007 |
| JP | 2011-024385 A | 2/2011 |
| JP | 2011-185311 A | 9/2011 |
| JP | 2012-257413 A | 12/2012 |
| JP | 2014-161952 A | 9/2014 |
| JP | 2016-032843 A | 3/2016 |
| JP | 2016-153156 A | 8/2016 |
| JP | 6034895 B2 | 11/2016 |
| JP | 2016-221607 A | 12/2016 |
| JP | 2017-184430 A | 10/2017 |
| TW | 20145467 * | 12/2015 |
| WO | 2007-091568 A1 | 8/2007 |

OTHER PUBLICATIONS

Office Action issued in Japanese Application No. 2017-227364, dated Mar. 2, 2021.

"Handbook of Mechanical Transmission Section," China Machine Press, Beijing, China, pp. 1299-1300, Sep. 30, 1999.

Wen, "Electrical Automation Engineering," Guangming Daily Publishing House, Beijing, China, pp. 80-82, Aug. 31, 2016.

Office Action issued in Chinese Application No. 201811366349.1, dated Sep. 27, 2021.

Office Action issued in Japanese Application No. 2021-132958, dated Aug. 23, 2022.

"Precision reduction gear RV high speed gearhead GH series", Obtained by Japan Patent Office, Mailing Number: 037962, Nabtesco Corporation, Japan, cited in Office Action issued in Japanese Application No. 2017-227364, dated May 10, 2022.

Office Action issued in Japanese Application No. 2017-227364, dated May 10, 2022.

* cited by examiner

GEAR MOTOR AND COOPERATING ROBOT

RELATED APPLICATIONS

Priority is claimed to Japanese Patent Application No. 2017-227364, filed Nov. 28, 2017, the entire content of which is incorporated herein by reference.

BACKGROUND

Technical Field

Certain embodiment relates to a gear motor which drives a joint portion of a cooperating robot and a cooperating robot.

Description of Related Art

In the related art, industrial robots which are operated in isolated environments with a person are widely used. Meanwhile, in recent years, a demand for a cooperating robot operating in collaboration with a person is expected to increase. The cooperating robot is also is disclosed in the related art.

SUMMARY

According to an embodiment of the present invention, there is provided a gear motor which drives a joint portion of a cooperating robot which performs a work in collaboration with a person including: a motor; and a speed reducer, in which in the gear motor, an operation ratio is 20% ED or less, a reduction ratio of the speed reducer is 30 or less, and an output rotating speed of the motor is 1000 rpm or less.

According to another embodiment of the present invention, there is provided a cooperating robot including: a joint portion; and the gear motor which is incorporated into the joint portion and drives the joint portion.

DETAILED DESCRIPTION

Joint portions of an industrial robot and a cooperating robot may be driven by a gear motor. However, demands of the industrial robot and the cooperating robot with respect to the gear motor are different from each other. If the gear motor of the industrial robot is applied to the joint portion of the cooperating robot as it is, there is a problem that the demand as the gear motor of the cooperating robot is not sufficiently satisfied.

It is desirable to provide a gear motor suitable for driving the joint portion of the cooperating robot. In addition, it is desirable to provide a cooperating robot into which the gear motor is incorporated.

According to the present invention, it is possible to provide the gear motor suitable for driving the joint portion of the cooperating robot. In addition, it is possible to provide the cooperating robot into which the gear motor is incorporated.

Hereinafter, an embodiment of the present invention will be described in detail with reference to the drawings.

Figure 1:
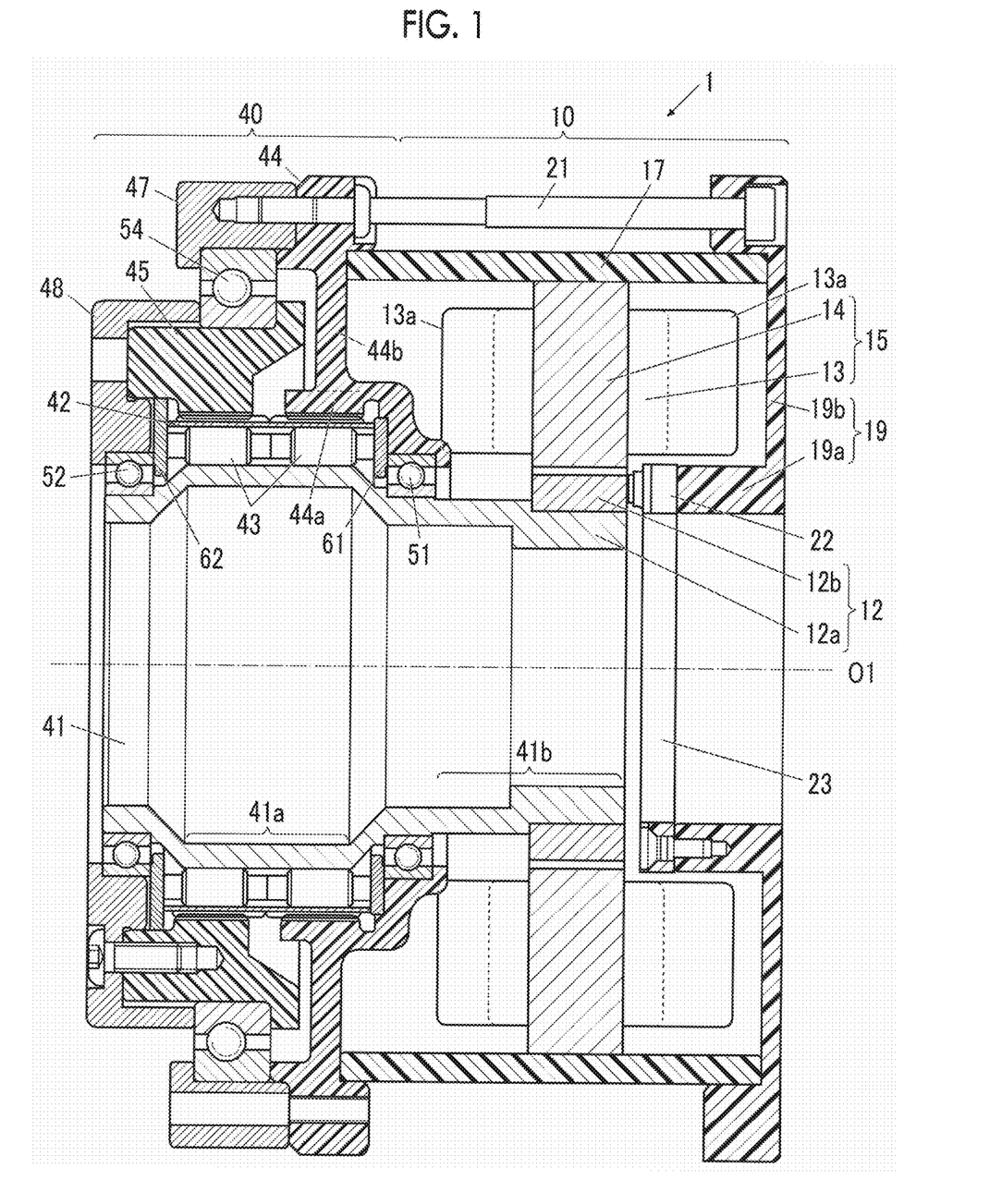
FIG. 1 is a sectional view showing a gear motor for driving a joint of a cooperating robot according to an embodiment of the present invention.
Figure 2:
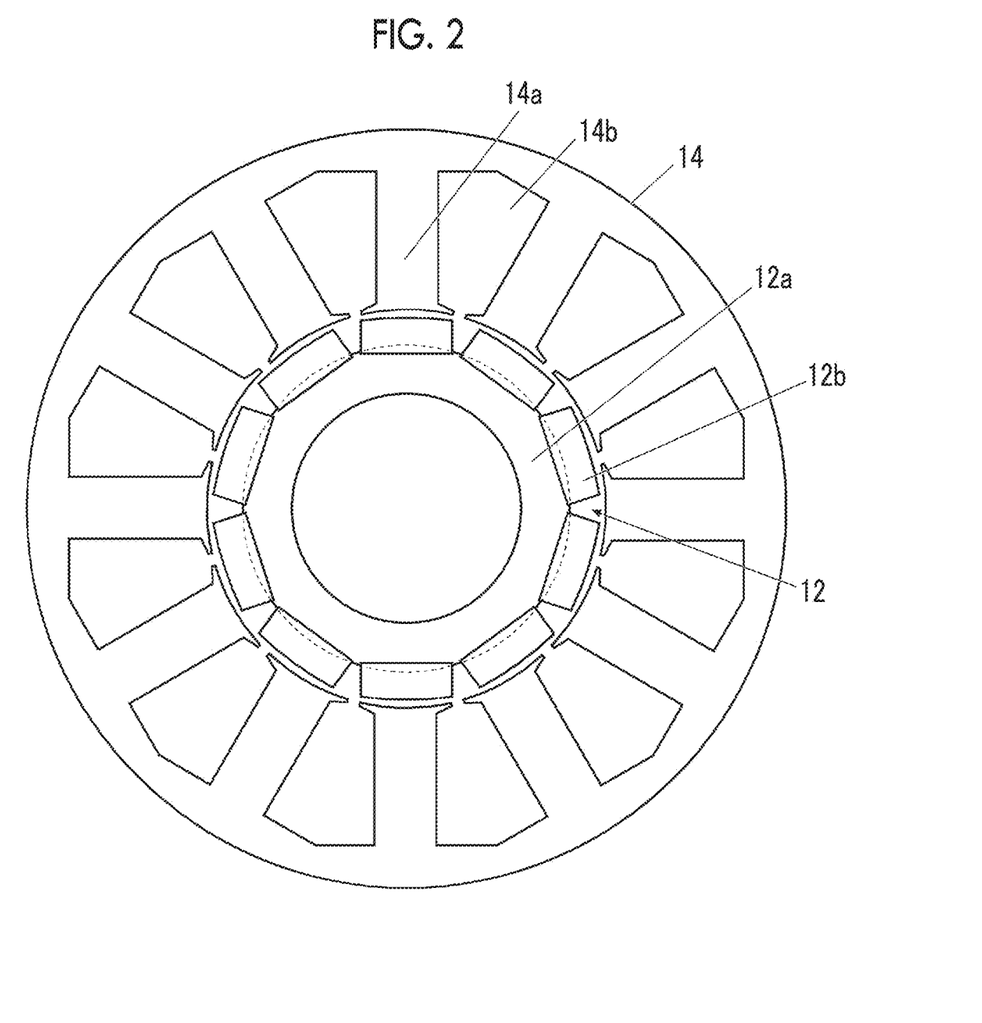
FIG. 2 is a front view showing a stator core and a rotor of a motor of FIG. 1.
Figure 3:
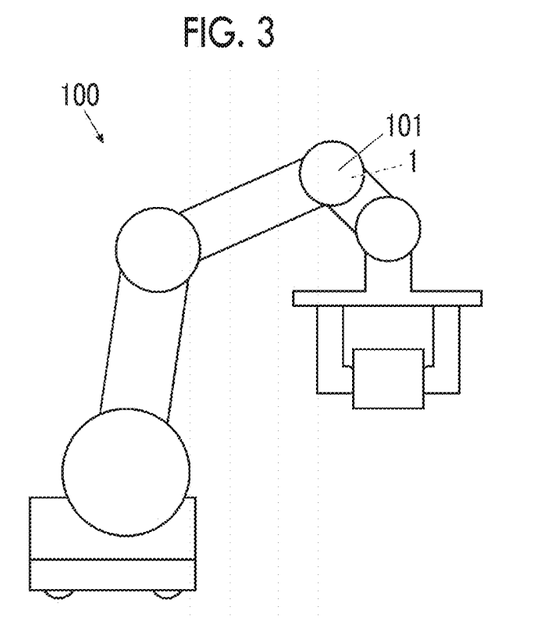
FIG. 3 is a view showing a cooperating robot of the embodiment.

FIG. 1 is a sectional view showing a gear motor for driving a joint of a cooperating robot according to an embodiment of the present invention. FIG. 2 is a front view showing a stator core and a rotor of a motor of FIG. 1. FIG. 3 is a view showing a cooperating robot of the embodiment. In the present specification, a direction along a central axis O1 of an input shaft 41 is defined as an axial direction, a direction orthogonal to the central axis O1 is defined as a radial direction, and a direction rotating about the central axis O1 is defined as a circumferential direction.

For example, a gear motor 1 of the present embodiment is incorporated into a joint portion 101 of a cooperating robot 100 shown in FIG. 3 to drive the joint portion 101. The cooperating robot 100 is different from an industrial robot, is disposed in a workspace which is not isolated with a person, and performs a predetermined work in collaboration with a person. The cooperating robot 100 performs a sensing control which detects a contact with a person so as to allow the contact with the person, a speed control by which a safe contact with a person is secured, or both the sensing control and the speed control. The cooperating robot may be referred to as a human cooperation robot.

The gear motor 1 of the present embodiment is configured by unitizing a motor 10 and a speed reducer 40.

Motor

The motor 10 includes a rotor 12 which includes a shaft portion 12a and a rotor magnet (permanent magnet) 12b and a stator 15 which includes a coil 13 and a stator core 14. In addition, the motor 10 includes a motor frame 17 which covers an outer peripheral side of the stator 15 and a motor cover 19 which covers one side (a counter-load side: a side opposite to the speed reducer 40) of the stator 15 in the axial direction. In addition, a portion of an internal gear 44 of the speed reducer 40 functions as a cover section 44b which covers the other side (a load side: speed reducer 40 side) of the stator 15 in the axial direction in the motor 10.

The shaft portion 12a is formed of an iron-based metal. A wire material constituting the coil 13 is an aluminum wire. The stator core 14 is constituted by a magnetic body. The motor frame 17 is formed of a resin. The cover section 44b and the motor cover 19 are formed of a resin. In addition, the resin parts may be formed of a composite material such as CFRP (Carbon Fiber Reinforced Plastics) or FRP (Fiber Reinforced Plastics), a composite material of a resin and other materials, or a bake material (a paper bake material, a cloth bake material, or the like). In addition, the metal parts may be formed of a metal such as aluminum having specific gravity lower than that of iron or an alloy such as an aluminum alloy or a magnesium alloy having specific gravity lower than that of iron. In addition, the material of each of the shaft portion 12a, the motor frame 17, the cover section 44b, and the motor cover 19 is not limited to the above-described example. That is, any material may be used as long as one or a plurality of materials are a material which has specific gravity lower than that of iron. Accordingly, it is possible to improve weight saving of the motor 10. From the viewpoint of torque characteristics of the motor 10, it is preferable that constituent members of the motor 10 are formed of a magnetic material such as iron or an electro-magnetic steel plate. Therefore, considering both weight saving and torque characteristics, a material of each constituent member of the motor 10 may be determined.

As shown in FIG. 2, the stator core 14 includes a plurality of core segments 14a and a plurality of slots 14b. The plurality of core segments 14a are disposed to be arranged in the circumferential direction such that inner peripheral surfaces of the core segments face the rotor 12. The plurality of slots 14b are provided between the plurality of core segment 14a.

The coil 13 is wound around the core segments 14a through the plurality of slots 14b. A portion of the coil 13 protrudes toward the outside from an end of the stator core 14 in the axial direction. A portion which protrudes in the axial direction from the slots 14b is a coil end 13a.

A shaft portion 12a of the rotor 12 has a hollow structure and is formed of a single member integrally with the input shaft 41 of the speed reducer 40. In addition, the input shaft 41 may be separately formed from the shaft portion 12a of the rotor 12 so as to be connected to each other.

The motor frame 17 is in contact with an outer peripheral portion of the stator core 14 so as to fix the stator core 14.

The cover section 44b mainly covers the one end (the speed reducer 40 side, the load side) of the stator core 14 in the axial direction. The cover section 44b is formed in an annular shape and includes a through hole, through which the input shaft 41 passes, at a center of the cover section 44b. An input bearing 51 is fitted into an inner peripheral portion of the cover section 44b, and the input shaft 41 is rotatably supported via the input bearing 51. The cover section 44b is particularly not limited. However, for example, the cover section 44b is connected to the motor cover 19 via a bolt 21, and the motor frame 17 is interposed between the cover section 44b and the motor cover 19 so as to be fixed.

The shortest creeping distance of the cover section 44b from the coil end 13a is shorter than 6.3 mm. In a motor of the related art, a cover is formed of a conductive material. In addition, in the related art, the creeping distance is equal to or more than 6.3 mm so as to secure insulation. Accordingly, a volume of a gear motor increases, an axial length increases, an input shaft is lengthened, and thus, there is a problem that weight of the entire device increases. However, in the present embodiment, the cover section 44b has insulation (is formed of a non-conductive material), the creeping distance is shorter than 6.3 mm, and thus, the above-described problems are alleviated. In addition, more preferably, the creeping distance between the cover section 44b and the coil end 13a is equal to or less than 3 mm, and most preferably, the creeping distance is equal to or less than 1 mm.

More specifically, the cover section 44b of the present embodiment is disposed to be in contact with a portion of the coil end 13a of the stator 15. Since the cover section 44b has insulation, even when the above-described contact is generated, sufficient insulation between the coil 13 and the cover section 44b and sufficient insulation between the motor 10 and the speed reducer 40 can be secured. Preferably, a contact area between the cover section 44b and the coil end 13a is 50% or less of a surface area of the coil end 13a on the speed reducer 40 side, and more preferably, is 10% or less of the surface area. If the cover section 44b is in contact with the entire coil end 13a, a coefficient of thermal expansion of the coil end 13a is different from a coefficient of thermal expansion of the cover section 44b, and thus, problems arise in durability of the cover section 44b and the coil end 13a. However, by setting the above-described contact area, even when the coefficients of thermal expansion are different from each other, it is possible to suppress a decrease in the durability.

The motor cover 19 mainly covers the other end (the side opposite to the speed reducer 40, the counter-load side) of the stator 15 in the axial direction. The motor cover 19 is formed in an annular shape and includes an inner peripheral wall portion 19a which covers an inner peripheral side of the coil end 13a positioned on the side opposite to the speed reducer 40 and a rear surface wall portion 19b which covers one end side on the side of the stator 15 opposite to the speed reducer 40. The inner peripheral wall portion 19a has a tubular shape whose hollow portion communicates with a hollow structure of the shaft portion 12a, and a load-side end surface of the inner peripheral wall portion 19a faces the rotor magnet 12b of the rotor 12. A magnetic sensor 22 for detecting a rotation position is provided on the load-side end surface of the inner peripheral wall portion 19a via an annular bracket 23.

The motor cover 19 is disposed to be close to the coil end 13a such that the shortest creeping distance from the coil end 13a is shorter than 6.3 mm. A portion of the motor cover 19 may be disposed to come into contact with the coil end 13a.

Speed Reducer

For example, the speed reducer 40 is bending meshing type gear device and includes the input shaft 41 having a wave generator 41a, an external gear 42 which is bent and deformed by the wave generator 41a, and two internal gears 44 and 45 which mesh with the external gear 42. In addition, the speed reducer 40 includes an outer peripheral housing 47 which covers an outer peripheral portion of the speed reducer 40 and a bearing housing 48. Moreover, the speed reducer 40 includes a wave generator bearing 43 which is disposed between the wave generator 41a and the external gear 42 and regulating members 61 and 62 which regulate axial movements of the external gear 42 and the wave generator bearing 43. In addition, the speed reducer 40 includes input bearings 51 and 52 which rotatably support the input shaft 41 and a main bearing 54 which rotatably supports one internal gear 45 with respect to the outer peripheral housing 47.

The input shaft 41 is formed of an iron-based metal. The external gear 42 is formed of a resin or a metal. The internal gears 44 and 45 are formed of a resin. The outer peripheral housing 47 and the bearing housing 48 are formed of a metal. In addition, the resin parts may be formed of a composite material such as CFRP or FRP, a composite material of a resin and other materials, or a bake material (a paper bake material, a cloth bake material, or the like). In addition, the metal parts may be formed of a metal such as aluminum having specific gravity lower than that of iron or an alloy such as an aluminum alloy or a magnesium alloy having lower specific gravity lower than that of iron. In addition, the material of each of the input shaft 41, the external gear 42, the internal gears 44 and 45, the outer peripheral housing 47, and the bearing housing 48 is not limited to the above-described example. That is, any material may be used as long as one or a plurality of materials are a material which has specific gravity lower than that of iron. Accordingly, it is possible to improve weight saving of the speed reducer 40. The material of each constituent member of the speed reducer 40 may be determined considering both the weight saving and strength securing.

The input shaft 41 has a hollow structure and includes a protrusion portion 41b which protrudes toward the motor side. A portion of the protrusion portion 41b constitutes the shaft portion 12a of the rotor 12. A portion of the input shaft 41 constitutes the wave generator 41a in which an outline of a cross section orthogonal to the central axis O1 is non-circular (for example, elliptical). In a portion of the input shaft 41 except for the wave generator 41a, an outline of a cross section thereof orthogonal to the central axis O1 is circular.

The external gear 42 is supported to be rotatable relative to the wave generator 41a via the wave generator bearing 43. The external gear 42 is fitted to the wave generator 41a in a state where the wave generator bearing 43 is interposed therebetween along an outer peripheral surface of the wave generator 41a.

The number of teeth of the two internal gears 44 and 45 are different from each other (for example, the number of teeth of the internal gear 44 is 62 which is greater than the number of teeth of the external gear 42 and the number of teeth of the internal gear 45 is 60 which is the same as the number of teeth of the external gear 42). One internal gear 44 is connected to the outer peripheral housing 47 which covers the outer peripheral portion of the speed reducer 40, and the other internal gear 45 is connected to the bearing housing 48 which covers one end side of the speed reducer 40 in the axial direction. A tooth section 44a of the internal gear 44 has a tubular shape and is formed of the same material as that of the cover section 44b so as to be a single member integrally with the cover section 44b. The cover section 44b also serves as an input cover of the speed reducer 40. That is, the cover section 44b covers the external gear 42 and the wave generator bearing 43 on the motor 10 side in the axial direction, and for example, prevents outflow of a lubricant from the speed reducer 40.

The input bearings 51 and 52 support the input shaft 41 on both sides of the wave generator 41a in the axial direction. One input bearing 51 is fitted into an inner periphery of the cover section 44b of the internal gear 44 so as to rotatably support the input shaft 41 and the other input bearing 52 is fitted to an inner periphery of the bearing housing 48 so as to rotatably support the input shaft 41. The main bearing 54 is fitted to inner peripheries of the outer peripheral housing 47 and the cover section 44b connected to each other and is fitted to the outer periphery of one internal gear 45 so as to rotatably support the internal gear 45 and the bearing housing 48.

Operation Explanation

If the coil 13 is energized and a rotational torque is generated in the rotor 12, the input shaft 41 integrated with the rotor 12 rotates about the central axis O1. A motion of the wave generator 41a according to the rotation of the input shaft 41 is transmitted to the external gear 42. Since a portion of the external gear 42 meshes with the fixed internal gear 44, the external gear 42 does not rotate following the rotation of the wave generator 41a, and the wave generator 41a rotates relative to the external gear 42 inside the external gear 42. In addition, the external gear 42 is regulated along the outer peripheral surface of the wave generator 41a, and thus, the external gear 42 is bent and deformed according to the rotation of the wave generator 41a. A period of this deformation is proportional to a rotation period of the wave generator 41a.

If the external gear 42 is deformed by the rotation of the wave generator 41a, a large diameter portion (long axis portion) of the wave generator 41a moves in the circumferential direction, and thus, a meshed position between the external gear 42 and the one internal gear 44 is changed in the circumferential direction. Since the numbers of teeth of the external gear 42 and the internal gear 44 are different from each other, every time the meshed position goes round, meshing teeth of the external gear 42 and the internal gear 44 are displaced, and thus, the external gear 42 rotates. For example, if the number of teeth of the internal gear 44 is 62 and the number of teeth of the external gear 42 is 60, the rotation motion of the wave generator 41a is decelerated at a reduction ratio of 30 (=60:2) and is transmitted to the external gear 42.

Meanwhile, the external gear 42 and the internal gear 45 similarly mesh with each other, and thus, a meshed position between the external gear 42 and the internal gear 45 is changed in the rotation direction by the rotation of the wave generator 41a. Since the numbers of teeth of the internal gear 45 and the external gear 42 are the same as each other, the external gear 42 and the internal gear are not rotated relative to each other, and the rotation motion of the external gear 42 is transmitted to the internal gear 45 at a reduction ratio of 1:1. Accordingly, the rotation motion of the wave generator 41a is decelerated at the reduction ratio of 30 and is output to the internal gear 45 which becomes the output shaft and the bearing housing 48.

During the driving of the gear motor 1, the coil 13 is energized. However, the cover section 44b which covers the one end side of the coil end 13a in the axial direction is formed of a non-conductive material, and thus, even when a distance between the cover section 44b and the coil end 13a is short, high insulation is secured between the coil 13 and the outside of the device, or between the coil 13 and the speed reducer 40. In addition, the cover section 44b and the coil 13 are in contact with each other. However, the contact surfaces thereof slide against each other such that the cover section 44b and the oil 13 are movable relative to each other. Accordingly, even when the coil 13 generates heat or thermally expands by the energization of the coil 13, only a very small distortion force is generated in the contact portion between the cover section 44b and the coil 13, which hardly affects durability of the cover section 44b and the stator 15.

Specification of Gear Motor

The gear motor 1 of the embodiment has the following specification.

1) An operation ratio (in a case where the gear motor 1 is incorporated into the joint portion 101 of the cooperating robot 100) is 20% ED or less 2) Efficiency of the gear motor 1 is 70% or more 3) The lost motion of the speed reducer 40 is 3 min or more (for example, 3 min to 30 min)

4) The reduction ratio is 30 or less

5) An output rotating speed of the motor 10 is 1,000 rpm or less

6) An input current density at a rated torque of the motor 10 is 8 A/mm$^2$ or more.

Figure 4:
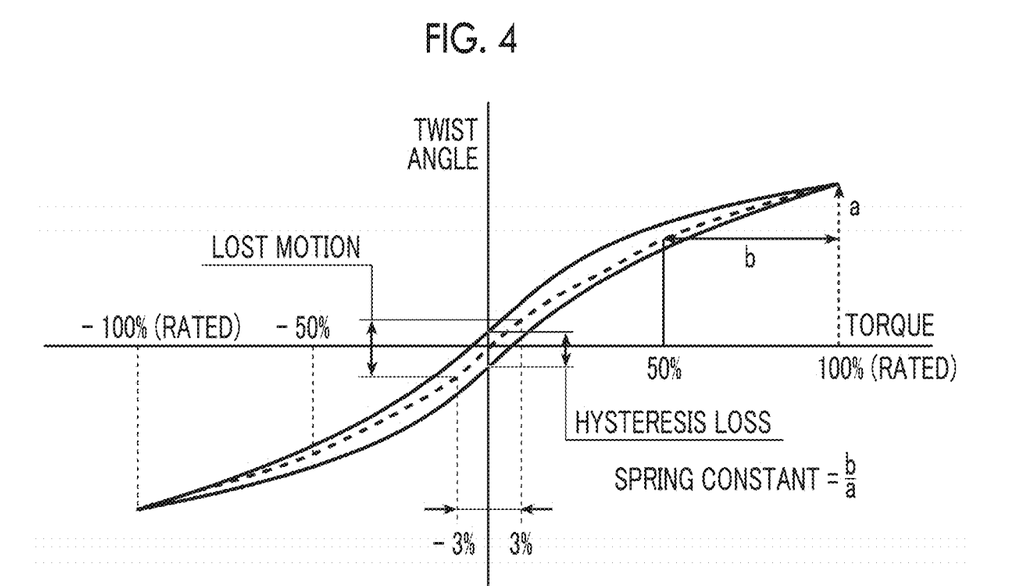
FIG. 4 is a graph explaining a lost motion.

Here, the operation ratio means a ratio of an operation time TJ of the gear motor 1 with respect to an operation time TR of the cooperating robot 100 into which the gear motor 1 is incorporated, and is expressed by (TJ/TR)×100 [% ED]. In addition, the operation time TR of the cooperating robot 100 itself can be defined a time during which a power supply of the cooperating robot 100 is turned on or a time during which a power supply of a drive source (servo motor) driving each joint is turned on. Accordingly, after the cooperating robot 100 performs a work on a workpiece, a waiting time waiting for the next workpiece to be set is also included in the operation time TR of the cooperating robot 100 itself. In addition, the operation time TJ of the gear motor 1 (speed reducer 40) can be defined as a time during which the speed reducer 40 which is a calculation object of the operation ratio is driven or a time during a drive source (servo motor) which drives the speed reducer 40 rotates (is controlled to rotate). The efficiency means a ratio of a machine output with respect to input power of the gear motor 1. The lost motion is an amount of the speed reducer with respect to backlash of the speed reducer 40 and is defined as follows. FIG. 4 is a graph explaining the lost motion. The input shaft 41 (high-speed shaft) of the speed reducer 40 is fixed, a load and displacement (twist angle) of the low-speed shaft are measured until a load is slowly applied to the input shaft from the bearing housing 48 (low-speed shaft) side to the rated torque and unloading is performed, and in a relationship therebetween as shown in FIG. 4, a rigid hysteresis curve is obtained. The lost motion is defined as the twist angle at points of rated torque ±3%. The output rotating speed is a rotation speed of the motor at the time of normal driving and an input current density at the rated torque means a density of the current flowing through the coil 13 when the rated torque is generated.

The specification of the gear motor 1 is set to meet the characteristics and requirements of the cooperating robot. Hereinafter, this will be described.

The driving unit of the cooperating robot has the following characteristics and requirements. First, compared to an industrial robot which is isolated from a person and performs a predetermined work, in the cooperating robot, in order to operate in collaboration with a person, the operation ratio at which each joint portion is driven is low, and an accuracy requirement of an operation is low. Meanwhile, since the cooperating robot has a possibility of contact with a person, or in order to improve a payload with respect to the own weight of the cooperating robot, weight saving of each part is required. In addition, in some cases, since battery driving is adopted in the cooperating robot, high efficiency of the driving unit is required, and since the cooperating robot is disposed in the same space as a person, low heat generation is required. In addition, the cooperating robot is incorporated into a production line which is flexibly changed, a renewal cycle of the cooperation robot is expected to be shortened, and thus, a demand for long life is low.

In a gear motor which drives a joint portion of an industrial robot which is isolated from a person and repeats a predetermined work at high speed repeatedly, in order to obtain high durability, typically, a heavy metal (iron or the like) having high rigidity for each part is used. Therefore, if the gear motor is applied to the cooperating robot, it becomes very difficult to satisfy the requirements of weight saving required for the cooperating robot.

Therefore, the present inventors have considered a plurality of characteristics of the cooperating robot in a complex manner and have conceived to use a material having a specific gravity smaller than that of iron for a portion of the speed reducer 40 of the gear motor 1, a portion of the motor 10, or both portions. As a specific example, the present inventors have conceived to use a resin for the materials of the internal gears 44 and 45, the motor frame 17, and the motor cover 19. Compared to a case where a steel material is used, if the material is used, positional accuracy of the operation and durability decrease. However, the driving unit of the cooperating robot has characteristics that the requirement for prolonging a life is low and characteristics that the accuracy requirement of the operation is low. For example, while a required service life of the industrial robot is approximately 10 years, a required service life of the cooperating robot is approximately 3 years. In addition, while the required accuracy of the operation of the industrial robot is approximately lost motion 1 min, the required accuracy of the operation of the cooperating robot is approximately lost 3 min or more and in most cases, is approximately lost motion 5 min. Therefore, even when the above-described material is used, it is possible to satisfy the required service life and the required accuracy of the operation as the driving unit of the cooperating robot. Furthermore, it is possible to realize the remarkable weight saving of the gear motor 1 which is required for the driving unit of cooperating robot. In consideration of the above-described circumstances, the lost motion of the speed reducer 40 of the present embodiment is set to 3 min or more. However, from the viewpoint of suppressing heat generation, the lost motion is preferably 5 min or more. Also, considering the controllability (control accuracy) of the cooperating robot, the lost motion is set to 30 min or less, but the lost motion is preferably 10 min or less.

In addition, in the gear motor which drives the joint portion of the industrial robot which is isolated from a human and repeatedly performs a predetermined work at high speed, in order to obtain a large torque and a high operation ratio (for example, approximately 50% ED), typically, the output of the motor speeds up and a high reduction ratio of the speed reducer is realized. The high reduction ratio of the speed reducer is realized, the motor torque can be greatly amplified by the speed reducer so as to be output, and a high operation ratio of the motor is realized as the motor torque is suppressed. However, if the gear motor is applied to the cooperating robot, it is difficult to realize high efficiency required for the gear motor of the cooperating robot. For example, the efficiency of the gear motor is approximately 60% at best. In principle, it has been found that the efficiency of the gear motor decreases as the output of the motor speeds up and the reduction ratio of the speed reducer increases.

Therefore, the present inventors have considered the plurality of characteristics of the cooperating robot in a complex manner and have conceived to decrease the speed such that the output of the motor 10 is 1000 rpm or less and to realize a low reduction ratio such that the speed reducer 40 has a reduction ratio of 30 (=30:1). As a result, in the efficiency of the gear motor 1, high efficiency such as 70% or more (in actual, 80% to 90%) is realized. However, in general, in order to realize the low speed of the output of the motor and the large torque, a size of the motor should be increased. Accordingly, there is a problem that the weight of the motor increases. Meanwhile, the driving unit of the cooperating robot has a characteristic that the requirement of the operation ratio is low (the operation ratio may be 20% ED or less, and in most cases, the operation ratio is approximately 10% ED). Therefore, with a low operation ratio as a condition of a control design, the present inventors set the input current density at the rated torque of the motor 10 to 8 A/mm$^2$ or more so as to increase an instantaneous torque of the motor 10. In addition, a continuous time during which a large current flows through the coil 13 is not lengthened due to the low operation ratio, and thus, the motor output having a low speed and a large torque is realized while increases in the size and the weight of the motor 10 are suppressed. That is, the setting is applied by using the characteristic that the requirement of the operation ratio is low for the driving unit of the cooperating robot, and thus, high efficiency of the gear motor 1 can be realized without increasing the weight of the gear motor 1.

As described above, according to the gear motor 1 of the present embodiment, the operation ratio is 20% ED or less, the reduction ratio of the speed reducer 40 is 30 or less, and the output rotating speed of the motor 10 is set to 1000 rpm or less. In addition, in the gear motor 1 of the present embodiment, the efficiency is 70% or more, the lost motion of the speed reducer 40 is 3 min or more, and a portion of the speed reducer 40, a portion of the motor 10, or both portions are formed of a material having specific gravity smaller than that of iron. As a result, a lightweight configuration having high efficiency is realized in conformity with the characteristics and requirements as the driving unit of the cooperating robot 100.

In addition, according to the cooperating robot 100 of the present embodiment in which the gear motor 1 is incorporated into the joint portion, the weight saving and the high efficiency of the cooperating robot 100 can be realized.

Hereinbefore, the embodiment of the present invention is described. However, the present invention is not limited to the above-described embodiment. For example, in the above-described embodiment, the example in which the bending meshing type speed reducer is used as the speed reducer is described. However, as the speed reducer, various speed reducer such as an eccentric oscillating type speed reducer or a planetary speed reducer may be used. In addition, for example, the cooperating robot according to the above-described embodiment includes any robot such as a device which holds and transports a workpiece, a device which processes a workpiece, a fixed robot, or a self-propelled robot as long as the robot can perform a collaborative work in the same workspace as a person. Moreover, details described in the embodiment can be appropriately changed without departing from the gist of the invention.

It should be understood that the invention is not limited to the above-described embodiment, but may be modified into various forms on the basis of the spirit of the invention. Additionally, the modifications are included in the scope of the invention.

What is claimed is:

1. A gear motor comprising:
    a motor configured to rotate at an output rotating speed of 1000 rpm or less; and
    a speed reducer configured to reduce the output rotating speed of the motor at a reduction ratio of 30 or less,
    wherein the motor comprises:
        a stator comprising a coil and a stator core,
        a motor cover that is disposed, in an axial direction, on a side of the stator opposite to the speed reducer, and
        a rotor comprising a shaft portion,
    wherein the motor cover includes a rear surface wall portion and an inner peripheral wall portion protruding from an inner peripheral end of the rear surface wall portion toward the rotor in the axial direction,
    wherein a hollow portion of the inner peripheral wall portion communicates with a hollow structure of the shaft portion,
    wherein the shaft portion of the rotor does not penetrate the inner peripheral wall portion of the motor cover in the axial direction, wherein the shaft portion is integrally formed as a single member with an input shaft of the speed reducer, and
    wherein the inner peripheral wall portion of the motor cover does not penetrate the shaft portion of the rotor in the axial direction.

2. The gear motor according to claim 1,
    wherein the gear motor has
        an operation ratio which is 20% ED or less,
        efficiency which is 70% or more,
        a lost motion of the speed reducer which is 3 min or more, and
        an input current density at a rated torque of the motor which is 8 A/mm2 or more.

3. The gear motor according to claim 1,
    wherein at least a portion of the speed reducer and the motor is formed of a material having specific gravity smaller than that of iron.

4. The gear motor according to claim 1,
    wherein the stator core comprises a magnetic body.

5. The gear motor according to claim 1,
    wherein the shaft portion is a metal.

6. The gear motor according to claim 1, further comprising:
    a sensor on a load-side end surface of the inner peripheral wall portion,
    wherein the sensor is configured to detect a rotation position.

7. The gear motor according to claim 1,
    wherein the inner peripheral wall portion is configured to cover an inner peripheral side of a coil end positioned on the side opposite to the speed reducer.

8. A cooperating robot comprising:
    the gear motor according to claim 1; and
    a joint portion configured to be driven by the gear motor.

9. The gear motor according to claim 1,
    wherein an inner diameter of a rotor-side end portion of the inner peripheral wall portion is larger than an inner diameter of an inner peripheral wall portion-side end portion of the shaft portion of the rotor.

10. The gear motor according to claim 1,
    wherein the motor further comprises:
        a motor frame configured to cover an outer peripheral side of the stator, and
        a cover section configured to cover a speed reducer side of the stator in the axial direction, and
        wherein the motor frame is interposed between the motor cover and the cover section so as to be fixed.

11. The gear motor according to claim 10,
    wherein the motor frame comprises a resin.

12. The gear motor according to claim 10,
    wherein the cover section is a resin.

13. The gear motor according to claim 10,
    wherein a shortest creeping distance of the cover section from a coil end of the coil is shorter than 6.3 mm.

14. The gear motor according to claim 13,
    wherein the coil end is in contact with the cover section.

15. The gear motor according to claim 13,
    wherein a contact area between the cover section and the coil end is 50% or less of a surface area of the coil end on the speed reducer side.

16. The gear motor according to claim 15,
    wherein the contact area between the cover section and the coil end is 10% or less of the surface area of the coil end on the speed reducer side.

17. The gear motor according to claim 10,
    wherein the speed reducer comprises an internal gear, a tooth section of the internal gear being on the cover section.

18. A method of operating a gear motor, the method comprising:
    rotating a motor at an output rotating speed of 1000 rpm or less; and
    reducing, by a speed reducer, the output rotating speed of the motor at a reduction ratio of 30 or less,
    wherein the motor comprises:
        a stator comprising a coil and a stator core,
        a motor cover that is disposed, in an axial direction, on a side of the stator opposite to the speed reducer, and
        a rotor comprising a shaft portion, wherein the motor cover includes a rear surface wall portion and an inner peripheral wall portion protruding from an inner peripheral end of the rear surface wall portion toward the rotor in the axial direction, wherein a hollow portion of the inner peripheral wall portion communicates with a hollow structure of the shaft portion, wherein the shaft portion of the rotor does not penetrate the inner peripheral wall portion of the motor cover in the axial direction, wherein the shaft portion is integrally formed as a single member with an input shaft of the speed reducer, and wherein the inner peripheral wall portion of the motor cover does not penetrate the shaft portion of the rotor in the axial direction.

* * * * *